July 11, 1939.   L. G. S. BROOKER ET AL   2,165,338
MEROCARBOCYANINE DYES AND PHOTOGRAPHIC EMULSIONS CONTAINING THE SAME
Filed Aug. 13, 1936

3-Ethyl-5-[(1-ethyl-2(1)-β-naphthothiazylidene)-isopropylidene]-rhodanine

Fig. 1.

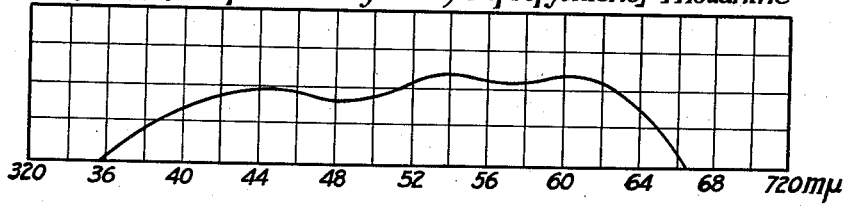

3-Ethyl-5-[(1-ethyl-2(1)-β-naphthothiazylidene)-isopropylidene]-2-thio-2,4(3,5)oxazoledione

Fig. 2.

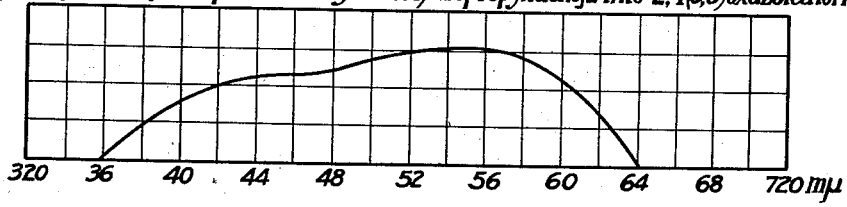

3-Phenyl-5-[(1-ethyl-2(1)-β-naphthothiazylidene)-ethyl-ethylidene]rhodanine

Fig. 3.

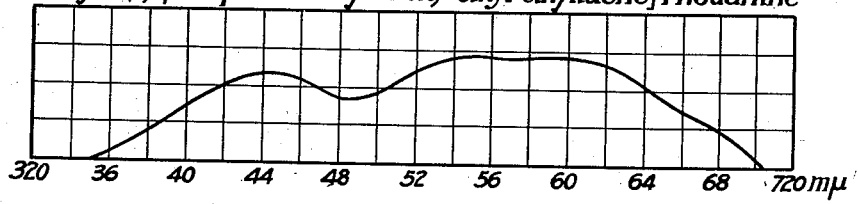

3-Ethyl-5-[(2-ethyl-1(2)benzothiazylidine)-isopropylidene]-2-thio-2,4(3,5)-oxazoledione

Fig. 4.

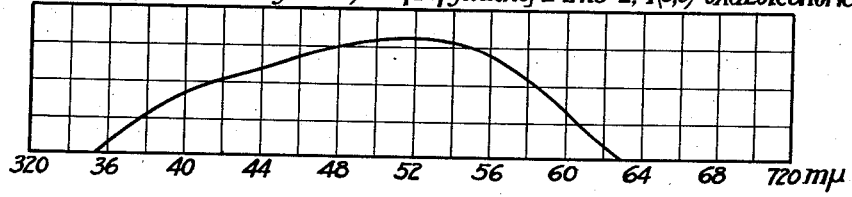

5-[(1-Ethyl-2(1)-β-naphthothiazylidene)-isopropylidene]-rhodanine

Fig. 5.

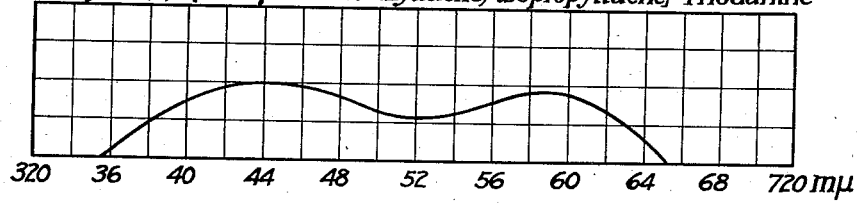

Leslie G. S. Brooker
Frank L. White
INVENTORS

BY
ATTORNEYS

Patented July 11, 1939

2,165,338

UNITED STATES PATENT OFFICE 2,165,338

MEROCARBOCYANINE DYES AND PHOTOGRAPHIC EMULSIONS CONTAINING THE SAME

Leslie G. S. Brooker and Frank L. White, Rochester, N. Y., assignors, by mesne assignments, to Eastman Kodak Company, Rochester, N Y., a corporation of New Jersey Application August 13, 1936, Serial No. 95,931
In Great Britain August 15, 1935

12 Claims. (Cl. 95—7)

This invention relates to merocarbocyanine dyes and photographic emulsions containing the same. More particularly this invention relates to chain-substituted merocarbocyanine dyes and to photographic emulsions, containing, as light-sensitive material, silver salts, and containing as sensitizing material, chain-substituted merocarbocyanine dyes.

The dyes which go to make up the emulsions of our inventions are in themselves new and can be represented by the following general formula:

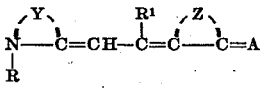

wherein A represents an atom, such as oxygen or sulfur, R represents an organic residue, such as an alkyl group, $R^1$ represents an organic residue, such as an alkyl or an aryl group, for example methyl, n-butyl, phenyl or furyl, Y represents the non-metallic atoms necessary to complete an arylothiazole or aryloselenazole nucleus and Z represents the non-metallic atoms necessary to complete a five-membered or six-membered heterocyclic nucleus.

The dyes of our invention can be prepared by condensing an acylmethylene derivative of an arylothiazoline or an aryloselenazoline with a heterocyclic compound containing a nuclear reactive methylene group. The reaction can be illustrated by the condensation of 1-acetylmethylene-2-ethyl benzothiazoline with barbituric acid, in the presence of acetic anhydride:

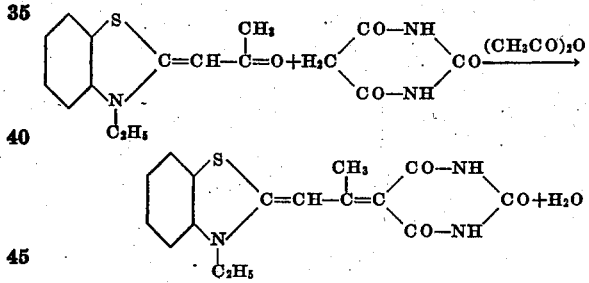

Other water-binding agents can be used in the process; for example propionic anhydride, butyric anhydride, or the like.

Arylothiazoline or aryloselenazoline acylmethylene derivatives can be similarly condensed with other barbituric acids or other heterocyclic nuclei such as rhodanine, 3-alkyl-rhodanines, 3-aryl-rhodanines, 2 - thio - 2,4(3,5) - oxazoledione, 3-alkyl - 2 - thio - 2,4(3,5)-oxazoledione, thiobarbituric and the like. Such heterocyclic nuclei are characterized by the following nuclear grouping:

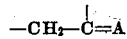

wherein A represents an atom such as oxygen or sulphur.

The following examples serve to illustrate the preparation of the dyes of our invention but are not intended to limit our invention.

*Example 1.—3-Ethyl-5-[(1-ethyl-2(1)-β-naphthothiazylidene)-isopropylidene]-rhodanine*

2.69 g. (1 mol.) of 2-acetylmethylene-1-ethyl-β-naphthothiazoline and 1.61 g. (1 mol.) of 3-ethylrhodanine were refluxed for about 20 minutes in 15 cc. acetic anhydride. The dye separated from the chilled reaction mixture after several days standing at 0° C. The crude dye was twice recrystallized from glacial acetic acid and was obtained in the form of green needles, melting at 251–253° C. with decomposition.

*Example 2.—5-[(1-ethyl-2(1)-β-naphthothiazylidene)-isopropylidene]-rhodanine*

2.69 g. (1 mol.) of 2-acetylmethylene-1-ethyl-β-naphthothiazoline and 1.33 g. (1 mol.) of rhodanine were refluxed in 15 cc. of acetic anhydride for about 15 minutes. The dye separated from the chilled reaction mixture after standing several days at 0° C. After recrystallization from glacial acetic acid, the dye was obtained as a very dark crystalline powder, melting at 264–265° C. with decomposition.

*Example 3.—3-Phenyl-5-[(1-ethyl-2(1)-β-naphthothiazylidene)-isopropylidene]-rhodanine*

2.69 g. (1 mol.) of 2-acetylmethylene-1-ethyl-β-naphthothiazoline and 2.09 g. (1 mol.) of 3-phenylrhodanine were refluxed in 15 cc. acetic anhydride for about 15 minutes. The dye separated from the chilled reaction mixture after standing about 4 days at 0° C. After recrystallization from glacial acetic acid, the dye was obtained as green crystals melting at 299–300° C. with decomposition.

*Example 4.—3-Ethyl-5-[(1-ethyl-2(1)-β-naphthothiazylidene)-isopropylidene] - 2 - thio - 2,4 (3,5)-oxazoledione*

2.69 g. (1 mol.) of 2-acetylmethylene-1-ethyl-β-naphthothiazoline and 1.45 g. (1 mol.) of 3-ethyl-2-thio-2,4(3,5)-oxazoledione were refluxed for about 20 minutes in 15 cc. of acetic anhydride. The dye separated from the chilled reaction mixture after four days standing at 0° C. The dye was recrystallized from glacial acetic acid and obtained as reddish crystals melting at 254–256° C.

*Example 5.—5-[(1-ethyl-2(1)-β-naphthothiazylidene)-isopropylidene] - 2 - thio -2,4,6-triketohexahydro-pyrimidine*

2.69 g. (1 mol.) of 2-acetylmethylene-1-ethyl-β-naphthothiazoline and 1.44 g. (1 mol.) of thiobarbituric acid were refluxed in 15 cc. of acetic anhydride for about 30 seconds. The dye separated from the reaction mixture chilled to 0° C. After two recrystallizations from pyridine, the dye was obtained as minute orange crystals, melting at 301–302° C. with decomposition.

*Example 6.—3-Phenyl-5-[(1-ethyl-2(1)-β-naphthothiazylidene)-ethyl-ethylidene]-rhodanine*

2.83 g. (1 mol.) of 1-ethyl-2-propionyl-methylene-β-naphthothiazoline and 2.09 g. (1 mol.) of 3-phenylrhodanine were refluxed in 15 cc. of acetic anhydride for about 30 minutes. The dye separated from the cooled reaction mixture after several days standing at 0° C. The crude dye was twice recrystallized from glacial acetic acid and obtained as green crystals melting at 266–268° C. with decomposition.

*Example 7.—3-Ethyl-5-[(2-ethyl-1(2)-benzothiaxylidene)-isopropylidene]-2-thio-2,4,(3,5)-oxazoledione*

2.19 g. (1 mol.) of 1-acetylmethylene-2-ethylbenzothiazoline and 1.45 g. (1 mol.) of 3-ethyl-2,4(3,5)-oxazoledione were refluxed in 25 cc. of acetic anhydride for 45 minutes. The dye separated from the cooled reaction mixture which had been diluted with ether after 2 days standing at 0° C. The crude dye was recrystallized from glacial acetic acid and obtained as minute light orange crystals, melting at 206–207° C. with decomposition.

*Example 8.—5 - [(2-Ethyl - 1(2) - benzothiazylidene) - isopropylidene] - 2 - thio - 2,4,6-triketohexahydropyrimidine*

2.19 g. (1 mol.) of 1-acetylmethylene-2-ethylbenzothiazoline and 1.4 g. (1 mol.) of thiobarbituric acid were refluxed in 25 cc. of acetic anhydride for about thirty seconds. The dye separated from the cooled reaction mixture at 0° C. After recrystallization twice from pyridine the dye was obtained as minute light orange crystals, melting at 332–334° C. with decomposition.

In a manner similar to that illustrated in the above examples other heterocyclic nuclei containing a reactive methylene group can be condensed with acylmethylene derivatives. Acylmethylene derivatives which can be advantageously used are acetyl, propionyl, benzoyl, phenyl-acetyl, phenoxyacetyl, ethoxyacetyl and furoyl.

With such acylmethylene derivatives non-cyclic and homocyclic compounds containing a reactive methylene group can be condensed. For example benzoylacetonitrile can be condensed with the above acylmethylene derivatives. The following example illustrates the condensation:

*Example 9.—α-[(1-Ethyl-2(1)-β-naphthothiazylidene) isopropylidene]-benzoylacetonitrile*

2.69 g. (1 mol.) of 2-acetylmethylene-1-ethyl-β-naphthothiazoline and 1.45 g. (1 mol.) of benzoylacetonitrile were refluxed for about 20 minutes in 15 cc. of acetic anhydride. The dye separated from the reaction mixture cooled to 0° C. after several days standing. After two recrystallizations from glacial acetic acid, the dye was obtained as pink needles, melting at 235–237° C. with decomposition.

The acylmethylene derivatives used herein can be prepared by condensing a cyclammonium quaternary salt, containing a reactive methyl group, with an acyl chloride or other halide in the presence of a base, advantageously a strong tertiary organic base. See our copending application, Serial No. 29,916, filed July 5, 1935 (now United States Patent No. 2,112,139, dated March 29 1938).

These new merocyanine dyes show a novel sensitizing action in photographic silver salt emulsions, particularly silver chloride and silver bromide emulsions. Accordingly, our invention is particularly directed to the customarily employed silver halide emulsions. However, the light-sensitive material employed in the emulsions of our invention can be any light-sensitive silver salt alone or combined with another light-sensitive silver salt, such as a silver halide. Our invention is further particularly directed to the customarily employed gelatin emulsions, gelatin being the carrier or medium in which the light-sensitive salt is suspended. However, any other suitable carrier, such as a cellulose derivative or a synthetic resin, which has substantially no desensitizing effect on the silver salt, can be used.

The sensitizing effect of these new dyes will be illustrated with reference to gelatino-silver-bromide emulsions. These illustrations will be made with particular reference to the dyes from rhodanines and 3-alkyl-2-thio-2,4(3,5)-oxazoledione with naphthothiazoles, as these dyes have proven particularly useful. Fig. 1 represents a gelatino-silver-bromide emulsion containing 3-ethyl-5-[(1-ethyl-2(1)-β-naphthothiazylidene)-isopropylidene]-rhodanine; Fig. 2, a bromide emulsion containing 3-ethyl-5-[(1-ethyl-2(1)-β-naphthothiazylidene) - isopropylidene] - 2 - thio-2,4(3,5) - oxazoledione; Fig. 3, a bromide emulsion containing 3-phenyl-5-[(1-ethyl-2(1)-β-naphthothiazylidene)-ethyl-ethylidene]-rhodanine; Fig. 4, a bromide emulsion containing 3-ethyl - 5 - [(2-ethyl - 1(2)-benzothiazylidene)-isopropylidene] - 2-thio-2,4(3,5)-oxazoledione; Fig. 5, a bromide emulsion containing 5-[(1-ethyl-2(1)-β-naphthothiazylidene) - isopropylidene] - rhodanine. Some of the herein disclosed dyes show small desensitizing effects together with sensitizing effects in another region of the spectrum. The nuclei of the dyes may be substituted by groups such as alkyl, alkoxy, amino, chloro and the like.

In the preparation of photographic emulsions containing these new dyes, it is only necessary to disperse, homogeneously and uniformly, from about 5 to about 100 mg. of the dye or mixture of dyes in about 1000 cc. of the flowable emulsion, the concentration of dye being varied according to the type of light-sensitive salt which goes to make up the emulsion and according to the effects desired. The suitable and most economical concentration for any given emulsion will be apparent to those skilled in the art, upon making the ordinary tests and observations customarily used in the art of emulsion-making. To prepare a gelatino-silver-halide emulsion, the following procedure is satisfactory: A quantity of the dye is dissolved in methyl alcohol pyridine or acetone and a volume of this solution (which may be diluted with water) containing from 5 to 100 mg. of dye is slowly added to about 1000 cc. of a gelatino-silver-halide emulsion with stirring. Stirring is continued until the dye is uniformly and practically homogeneously dispersed.

With the more powerful of these new sensitizing dyes 10 to 20 mg. of dye per 1000 cc. of emulsion suffice to produce the maximum sensitizing effect with the ordinary gelatino-silver-halide emulsions. The above statements are only illustrative and not to be understood as limiting our invention in any sense, as it will be apparent that these dyes can be incorporated by other methods in many of the photographic emulsions customarily employed in the art, such for instance as by bathing, the plate or film, upon which the emulsion has been coated, in a solution of the dye in an appropriate solvent, although such a method is ordinarily not to be preferred. The claims are intended to cover any combination of these new dyes with a photographic silver salt emulsion whereby the dye exerts a sensitizing effect upon the emulsions as well as a photographic element comprising a support, ordinarily transparent, upon which the light-sensitive emulsion is coated or spread and permitted to set or dry.

The herein disclosed dyes are useful in the construction of light filters. The dyes are also useful as coloring matters for textiles, particularly cellulose acetate silk or the like.

It is to be understood that the herein disclosed dyes probably exist in two forms illustrated as follows:

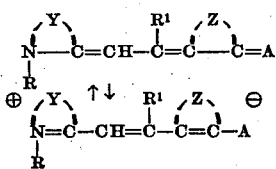

As illustrated these forms are interconvertible one into the other, i. e. the forms are virtual tautomers.

What we claim as our invention and desire to be secured by Letters Patent of the United States of America is:

1. A photographic silver salt emulsion containing a sensitizing dye selected from the group of dyes characterized by the following formula:

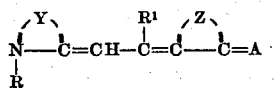

wherein A represents an atom selected from the group consisting of oxygen and sulfur, R represents an alkyl group, $R^1$ represents an organic residue selected from the group consisting of alkyl groups and aryl groups, Y represents the non-metallic atoms necessary to complete a nucleus selected from the group consisting of benzothiazole, benzoselenazole, naphthothiazole and naphthoselenazole and Z represents the non-metallic atoms necessary to complete a nucleus selected from the group consisting of five-membered and six-membered heterocyclic nuclei.

2. A photographic silver halide emulsion containing a sensitizing dye selected from the group of dyes characterized by the following formula:

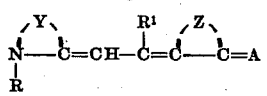

wherein A represents an atom selected from the group consisting of oxygen and sulfur, R represents an alkyl group, $R^1$ represents an organic residue selected from the group consisting of alkyl groups and aryl groups, Y represents the non-metallic atoms necessary to complete a nucleus selected from the group consisting of benzothiazole, benzoselenazole, naphthothiazole and naphthoselenazole and Z represents the non-metallic atoms necessary to complete a nucleus selected from the groups consisting of five-membered and six-membered heterocyclic nuclei.

3. A photographic gelatino-silver-halide emulsion containing a sensitizing dye selected from the group of dyes characterized by the following formula:

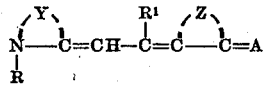

wherein A represents an atom selected from the group consisting of oxygen and sulfur, R represents an alkyl group, $R^1$ represents an organic residue selected from the group consisting of alkyl groups and aryl groups, Y represents the non-metallic atoms necessary to complete a nucleus selected from the group consisting of benzothiazole, benzoselenazole, naphthothiazole and naphthoselenazole and Z represents the non-metallic atoms necessary to complete a nucleus selected from the group consisting of five-membered and six-membered heterocyclic nuclei.

4. A photographic-gelatino-silver-halide emulsion containing a sensitizing dye selected from the group of dyes characterized by the following formula:

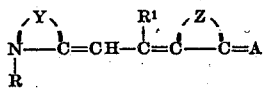

wherein A represents an atom selected from the group consisting of oxygen and sulfur, R represents an alkyl group $R^1$ represents an alkyl group, Y represents the non-metallic atoms necessary to complete a nucleus selected from the group consisting of benzothiazole, benzoselenazole, naphthothiazole and naphthoselenazole and Z represents the non-metallic atoms necessary to complete a nucleus selected from the group consisting of five-membered and six-membered heterocyclic nuclei.

5. A photographic-gelatino-silver-halide emulsion containing a sensitizing dye selected from the group of dyes characterized by the following formula:

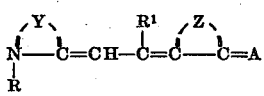

wherein A represents an atom selected from the group consisting of oxygen and sulfur, R represents an alkyl group, $R^1$ represents an alkyl group, Y represents the non-metallic atoms necessary to complete a naphthothiazole nucleus, and Z represents the non-metallic atoms necessary to complete a nucleus selected from the group consisting of five-membered and six-membered heterocyclic nuclei.

6. A photographic-gelatino-silver-halide emulsion containing a sensitizing dye selected from the group of dyes characterized by the following formula:

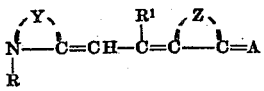

wherein A represents an atom selected from the group consisting of oxygen and sulfur, R represents an alkyl group, $R^1$ represents an alkyl group, Y represents the non-metallic atoms necessary to complete a β-naphthothiazole nucleus, and Z represents the non-metallic atoms necessary to complete a nucleus selected from the group consisting of five-membered and six-membered heterocyclic nuclei.

7. A photographic-gelatino-silver-halide emulsion containing a sensitizing dye selected from the group of dyes characterized by the following formula:

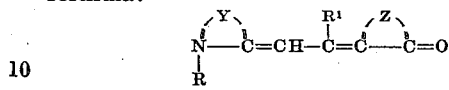

wherein R represents an alkyl group, $R^1$ represents an alkyl group, Y represents the non-metallic atoms necessary to complete a β-naphthothiazole nucleus and Z represents the non-metallic atoms necessary to complete a rhodanine nucleus.

8. A photographic-gelatino-silver-halide emulsion containing a sensitizing dye selected from the group of dyes characterized by the following formula:

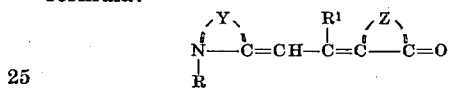

wherein R represents an alkyl group, $R^1$ represents an alkyl group, Y represents the non-metallic atoms necessary to complete a β-naphthothiazole nucleus and Z represents the non-metallic atoms necessary to complete a 2,4,6-triketohexahydropyrimidine nucleus.

9. A photographic-gelatino-silver-halide emulsion containing a sensitizing dye selected from the group of dyes characterized by the following formula:

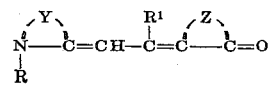

wherein R represents an alkyl group, $R^1$ represents an alkyl group, Y represents the non-metallic atoms necessary to complete a β-naphthothiazole nucleus and Z represents the non-metallic atoms necessary to complete a 2-thio-2,4(3,5)-oxazoledione nucleus.

10. A photographic gelatino-silver-halide emulsion sensitized with 3-phenyl-5-[(1-ethyl-2(1)-β-naphthothiazylidene)-isopropylidene] - rhodanine.

11. A photographic gelatino-silver-halide emulsion sensitized with 3-ethyl-5-[(1-ethyl-2(1)-β-naphthothiazylidene)-isopropylidene]-2-thio-2,4(3,5)-oxazoledione.

12. A photographic gelatino-silver-halide emulsion sensitized with 5-[(1-ethyl-2(1)-β-naphthothiazylidene)-isopropylidene]-2-thio-2,4,6 - triketohexahydropyrimidine.

LESLIE G. S. BROOKER.
FRANK L. WHITE.